US008998250B2

(12) United States Patent
Kruse et al.

(10) Patent No.: US 8,998,250 B2
(45) Date of Patent: Apr. 7, 2015

(54) CURTAIN AIRBAG FOR A VEHICLE (75) Inventors: Dion Kruse, Alingsås (SE); Jan Mazanek, Billdal (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/996,594

(22) PCT Filed: Nov. 25, 2011

(86) PCT No.: PCT/SE2011/051427
§ 371 (c)(1),
(2), (4) Date: Jun. 21, 2013

(87) PCT Pub. No.: WO2012/091656
PCT Pub. Date: Jul. 5, 2012

(65) Prior Publication Data
US 2013/0270805 A1    Oct. 17, 2013

(30) Foreign Application Priority Data
Dec. 29, 2010    (DE) .......................... 10 2010 056 342

(51) Int. Cl.
*B60R 21/232* (2011.01)
*B60R 21/2338* (2011.01)
*B60R 21/231* (2011.01)
*B60R 21/235* (2006.01)

(52) U.S. Cl.
CPC . *B60R 21/23138* (2013.01); *B60R 2021/23386* (2013.01); *B60R 21/232* (2013.01); *B60R 21/2338* (2013.01); *B60R 2021/23107* (2013.01); *B60R 2021/23547* (2013.01); *B60R 2021/23576* (2013.01)

(58) Field of Classification Search
CPC  B60R 21/232; B60R 21/231; B60R 21/2338; B60R 2021/23386; B60R 2021/0009
USPC .............. 280/730.2, 730.1, 729, 743.1, 743.2
See application file for complete search history.

(56) References Cited

U.S. PATENT DOCUMENTS

| 6,695,342 | B2 | 2/2004 | Tanase et al. | |
| 7,762,579 | B2 | 7/2010 | Garner | |
| 7,784,823 | B2 | 8/2010 | Heigl et al. | |
| 2003/0132624 | A1* | 7/2003 | Hall et al. | 280/743.1 |
| 2010/0025971 | A1* | 2/2010 | Steinbach et al. | 280/729 |

FOREIGN PATENT DOCUMENTS

| DE | 10 2007 028 803 A1 | 12/2008 |
| EP | 1110825 A1 | 6/2001 |
| EP | 1264742 A2 | 12/2002 |
| JP | 2008-006895 A | 1/2008 |

OTHER PUBLICATIONS

International Search Report and Written Opinion of the ISA, ISA/SE, Stockholm, mailed Mar. 26, 2012.

* cited by examiner

*Primary Examiner* — Keith Frisby
(74) *Attorney, Agent, or Firm* — Harness, Dickey & Pierce, P.L.C.

(57) ABSTRACT

A curtain airbag for a vehicle includes a main chamber shaped in such a way that, in a position being mounted on the vehicle, in the inflated state the main chamber covers an inner side structure of the vehicle. The curtain airbag further includes an additional chamber which, in the mounting position, is located on the in driving direction of the vehicle front portion of the main chamber, and deploys in the direction of the interior of the vehicle when the curtain airbag is inflated.

18 Claims, 8 Drawing Sheets

CURTAIN AIRBAG FOR A VEHICLE

FIELD

The invention relates to a curtain airbag for a vehicle.

BACKGROUND

The curtain airbag is located in the vehicle at the upper edge of the inner side structure of the vehicle and, in the event of an accident, is inflated in such a way that in the inflated state it covers the inner side structure of the vehicle and thereby prevents the occupant from directly hitting the same and sustaining severe injuries.

For the protection of the occupant, an airbag, which is designed as most often a round bag and in the inflated state covers the steering wheel, is further provided in the steering wheel of the vehicle as well. As the steering wheel naturally is arranged to perform a rotational movement, with a steering wheel hub not being fixed the airbag as well performs this rotational movement, so that the airbag itself needs to be designed to be symmetric and in particular to be round, in order that it can fulfill its protective function independent of the position of the steering wheel.

Thus, in the event of an accident, during the occurring forward movement the occupant generally is protected by the side curtain airbag and the airbag in the steering wheel.

In tests it has turned out that in the event of a frontal impact with a small overlap only, for example of 10-25% of the front end of the vehicle, the A-pillar already at low impelling forces is dislocated very far into the passenger compartment. Furthermore, the dashboard of the vehicle is dislocated from its side edge obliquely to the center and the lower part of the A-pillar is intruding into the compartment of the vehicle, so that an enlarged gap between the side edge of the dashboard and the inner side structure of the vehicle is generated. Owing to the impact direction the occupant further is accelerated directly in the direction of the gap existent between the curtain airbag and the airbag of the steering wheel, so that owing to the non-existent connection of the airbags the occupant may hit the A-pillar moving in or from above may hit the side door frame through the airbags, or the occupant slides off the frontal airbag into the gap.

For the above-mentioned reasons, an enhanced risk of injury for the occupant even results from accidents with low impelling forces and a small lateral overlap.

SUMMARY

It is the object of the invention to provide a curtain airbag, with which the risk of injury for the occupant which is enhanced due to the above-mentioned reasons can be reduced.

For the solution of the object it is proposed that the curtain airbag comprises an additional chamber which, in the mounting position, is located in the driving direction of the vehicle front portion of the main chamber, and deploys in the direction of the interior of the vehicle when the curtain airbag is inflated. Thus, the advantage of the curtain airbag improved according to the invention is that the curtain airbag is inflated together with the additional chamber to form a curved structure, in which the occupant is caught during the forward displacement, so that he cannot pass through the gap between the curtain airbag and the airbag in the steering wheel. The additional chamber deploying into the interior of the vehicle owing to its direction of deployment covers the A-pillar and the front section of the upper door frame, so that the surface of the interior of the vehicle as a whole is covered by the curved curtain airbag even in an area, the occupant would be very likely to hit during the obliquely directed forward displacement, whereby the risk of severe injuries in the event of accidents with a small overlap can be reduced significantly. The term "deploys in the direction of the interior of the vehicle" means, that the additional chamber is extending from the plane inner side structure of the vehicle into the interior of the compartment, which results finally to an L-shaped design of the curtain airbag.

It is further proposed that the additional chamber shows such a shaping that the inflation length of the curtain airbag, in the mounting position, is longer at the lower edge than at the upper edge. The suggested design provides the advantage, that the risk for the occupant of diving underneath the curtain airbag without hitting on the curtain airbag is reduced.

It is further proposed that the additional chamber in the inflated state shows an obliquely directed orientation sloping upwards in the longitudinal direction of the vehicle. As the occupant during the forward movement towards the end of the movement with the head and the upper body further performs a downward movement, a catching surface which is as large as possible can be provided by the proposed orientation of the additional chamber.

A further preferred embodiment of the invention can be seen in that the additional chamber is formed by a chamber volume being at least partially separated from the main chamber, which volume is separated from the main chamber by a separation line which, in the inflated state of the curtain airbag, in the longitudinal direction of the vehicle runs obliquely upwards.

The obliquely directed separation line forms a hinge which due to its orientation at the same time determines or at least supports the moving direction of the additional chamber during the deployment process.

The orientation and shaping of the curtain airbag extended by the additional chamber can be further enforced by at least two additional chambers being provided, which are separated from the main chamber or from each other by obliquely directed separation lines. Due to the proposed solution the curtain airbag in the inflated state can be shaped like a mattress, whereby the required filling volume of the curtain airbag can be reduced without being detrimental to the protective function. Moreover, the effect of the proposed direction of deployment can be further intensified, as with the additional separation lines additional hinges are provided, by which a curved shaping of the curtain airbag is rendered possible also in this section.

A solution which is very easy to manufacture and cost effective for realizing the separation line can be seen in that the separation line is realized by a seam. The seam can be produced in one step when manufacturing the curtain airbag in an One Piece Woven technology or when the curtain airbag is produced by sewing the curtain airbag from two separated halves.

It is further proposed that on the curtain airbag a tightening strap is provided, which with one end is fastened to the main chamber at a first attachment point, and with the other end is so fastened to the additional chamber at a second attachment point, and that the tightening strap is shorter than the maximum distance between the first and the second attachment point, which would result from the curtain airbag being inflated without the tightening strap. When the curtain airbag is inflated, the additional chamber is automatically pulled into the interior of the vehicle by the tightening strap or rather is pulled towards the main chamber, as the curtain airbag due to the shorter tightening strap cannot be inflated to a planar surface in the connection line of the first and the second attachment point.

The second attachment point and the first attachment point preferably are located on the curtain airbag in such a way that the second attachment point is located beneath the first attachment point and, in the longitudinal direction of the vehicle, is located in front of the first attachment point. Due to the proposed arrangement of the attachment points and the path of the tightening strap determined thereby the additional chamber is not only pulled towards the main chamber or rather is pulled into the interior of the vehicle, but with the lower edge is further pulled upwards in the direction of the occupant, so that the occupant during the forward movement with the head preferably dives into the additional chamber.

A very good restraint characteristic and protection for the occupant can be achieved when the additional chamber inflates substantially perpendicular to the main chamber.

Furthermore it is suggested that the curtain airbag is shaped in such a way, that at least the additional chamber is extending with a section downwardly from the lower rim of the main chamber. The advantage of the suggested extension can be seen in that the risk for the occupant of diving under the bag can be further reduced. The curtain airbag comprises therefore a bigger surface exposed towards the occupant, which protects the occupant from hitting onto the structure parts or moving into the described gap also when the tension of the curtain airbag is reduced by intruding the A-pillar into the compartment.

Another preferred embodiment of the invention can be provided when the additional chamber is folded backwards onto the main chamber using a separation line as a hinge. The advantage of this solution can be seen therein that the additional chamber got an advantageous orientation with respect to the main chamber which and will be inflated automatically in the direction of the interior of the vehicle. The separation line acts in this case as a hinge for folding the additional chamber onto the main chamber and in the same way for enabling the movement of the additional chamber into the interior of the vehicle.

It is further suggested that the additional chamber comprises an attachment tab which is folded onto an attachment tab of the main chamber and fixed with the attachment tab of the main chamber with a common fixation element for fixing both tabs together at the inner side structure of the vehicle. The advantage of this solution is that the additional chamber is fixed in the folded status. Furthermore the additional chamber is fixed also during the inflation via the tab, so that the main chamber will be kept in an orientation directed towards the main chamber and the interior of the vehicle also during the inflation. The attachment tab of the additional chamber acts in this case in the same manner like the tension strap to oblige the additional chamber in a predetermined orientation to the main chamber.

In this case it is advantageous if the additional chamber is separated from the main chamber by a vertical running separation line which defines the movement of the additional chamber. The additional chamber is pivoted around a length axis defined by the course of the separation line, which is in this case running vertical, so that the additional chamber is pivoted like a door closing the gap between the steering wheel and the inner side structure of the vehicle as quick as possible.

Another preferred embodiment of the invention can be provided, when the additional chamber is separated from the main chamber or from another additional chamber by two distanced separation lines which enclose a non inflatable section. The non inflatable section facilitates the pivoting movement between the chambers as the chambers are distanced from each other.

Furthermore it is suggested that the additional chamber is separated from the main chamber by a separation line which runs in a closed loop. The suggested course of the separation line is easy to manufacture especially when the separation line is realized by a seam as the separation line can be manufactured in one step without any interruption for example in one stitching process without lifting the needle or interrupting the seam. Furthermore the loop encloses a non inflatable section having a differing width, which obliges the chambers during the inflation automatically in an inwardly directed orientation closing the gap between the driver airbag and the interior side structure.

DRAWINGS

In the following, the invention is described on the basis of preferred embodiments with reference to the accompanying figures. The figures show in detail.

DETAILED DESCRIPTION

Figure 1:
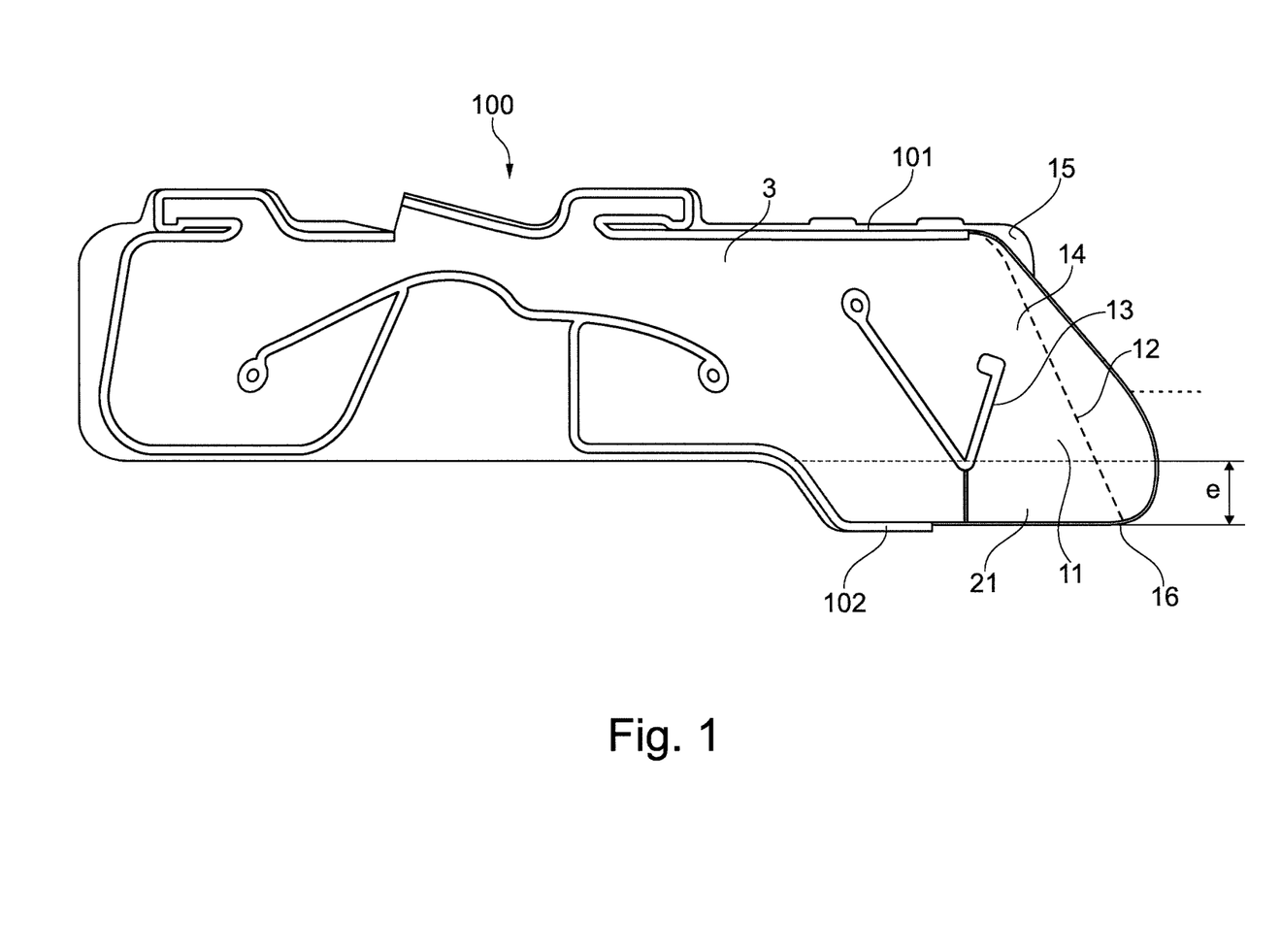
FIG. 1: Curtain airbag with additional chamber.

FIG. 1 shows a curtain airbag 100 designed according to the invention comprising a main chamber 3 and an additional chamber 11 which, in the mounting position, is located in the driving direction front portion of the main chamber 3. The additional chamber 11 is separated from the main chamber 3 by a separation line 13 and is flow-connected to the main chamber 3 via a flow channel 14, so that the additional chamber 11 is automatically inflated, when the main chamber 3 is inflated.

The separation line 13 is oriented in such a way that, in the mounting position of the curtain airbag 100, upon inflation it runs obliquely upwards in the driving direction.

Furthermore, at the upper edge 101, a tightening strap 12 is fastened to a first attachment point 15 with one end. With the second end, the tightening strap 12 is fastened to the additional chamber 11 at a second attachment point 16 at the lower edge 102 of the curtain airbag 100, and its length is dimensioned to be shorter than the distance between the first and the second attachment point 15 and 16 when the curtain airbag 100 is spread planarly. The second attachment point 16 is located on the curtain airbag 100 in such a way that, in the mounting position of the curtain airbag 100 in the driving direction, upon inflation it is located in front of and beneath the first attachment point 15. Starting from the first attachment point 15 the tightening strap 12 thus runs forward and obliquely downwards.

The additional chamber 11 and also a part of the main chamber 3 is provided with a section 21 extending downwardly from the lower rim of the main chamber 3 with a dimension "e". When the curtain airbag 100 is inflated the occupant is protected by a much bigger surface of the airbag especially in the lower front area of the additional chamber 11, which is the most risk area for the occupant in case of front accidents with a small overlap.

Figure 2:
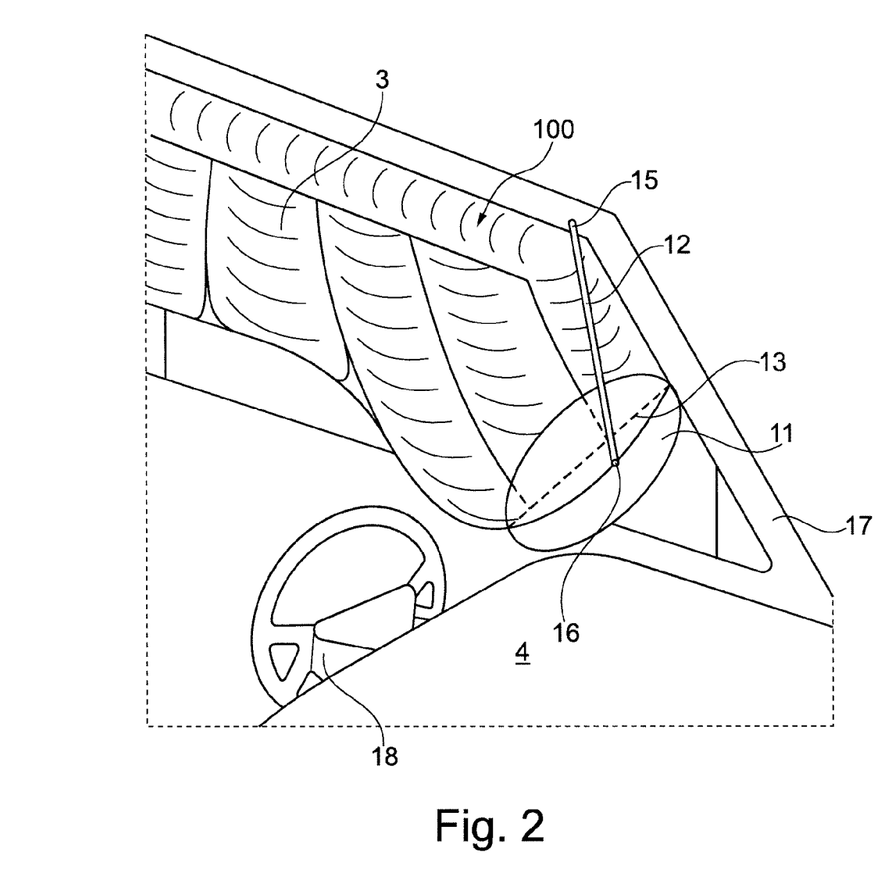
FIG. 2: Vehicle interior with inflated curtain airbag.

As can be seen in FIG. 2, the curtain airbag 100 in the inflated state with the main chamber 3 covers the inner side structure which in passenger cars essentially is formed by the side window surfaces and the inner surfaces of the pillars. At the driving direction front portion of the main chamber 3 the additional chamber 11 can be seen, which is connected with the main chamber 3 via the tightening strap 12 fastened to the second attachment point 16. For this purpose, the tightening strap 12 is fastened to a first attachment point 15 at the upper edge 101 of the curtain airbag 100.

As can be seen from the FIGS. 1 and 2, the additional chamber 11 is separated from the main chamber 3 by a separation line 13, and, at the same time, is flow-connected to the main chamber 3 via the flow channel 14. The additional chamber 11 can be formed integrally with the main chamber 3, it is only important that the additional chamber 11 performs the movement directed into the interior of the vehicle, when the curtain airbag 100 is inflated. Thus, the main chamber 3 can also be regarded as the part of the curtain airbag 100, which upon inflation covers an inner side structure 10 in a planar manner. Although the curtain airbag 100 is a one-piece airbag, owing to the arrangement of the additional chamber 11, besides the lateral protective function, the curtain airbag 100 can further be used for the protection of the occupant during the obliquely forward directed forward displacement. The airbag thus is an airbag showing an intentional three-dimensional shaping.

Figure 3:
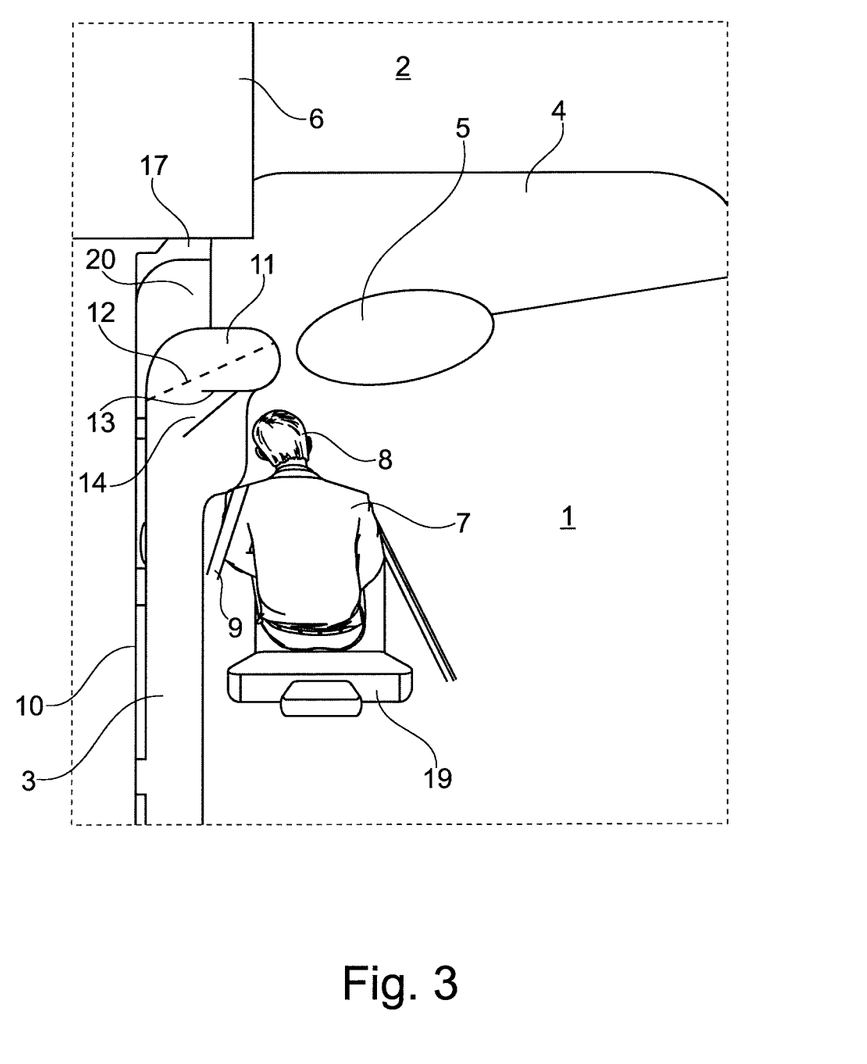
FIG. 3: Top view of vehicle interior with occupant and curtain airbag.

FIG. 3 shows the curtain airbag 100 in the inflated state in the interior 1 of the vehicle which is currently being decelerated by an object 6 intruding frontally with a small overlap. An A-pillar 17 is pushed into the interior 1 of the vehicle and a dashboard 4 is displaced from its edge in the direction so of the center of the interior 1 by the intruding object 6. Due to the dashboard 4 being displaced obliquely inwards a gap 20 is generated between the edge of the dashboard 4 and the inner side structure 10 of the vehicle. Furthermore, an occupant 7 sitting in a vehicle seat 19 can be seen, which owing to the suddenly acting vehicle deceleration performs a forward movement in the direction of the gap 14 or the A-pillar 17. As the additional chamber 11 of the curtain airbag 100 according to the invention is located on the main chamber 3 in such a way that it deploys in the direction of the interior 1 of the vehicle, the curtain airbag 100 with the additional chamber 11 covers the gap 14 and/or the intruding A-pillar 17 and/or the upper edge of the door frame, so that the occupant 7 cannot hit one of these parts in a non-protected manner or intrude into the gap 14. In fact, a catching structure, which laterally as well as frontally protects the occupant 7 and in particular the head 8 of the occupant 7, is provided by the additional chamber 11 and the main chamber 3 in this area. Provided that the occupant 7 is wearing a safety belt 9, the obliquely directed forward movement already results from the safety belt 9 engaging asymmetrically over a shoulder of the occupant 7.

Figure 5:
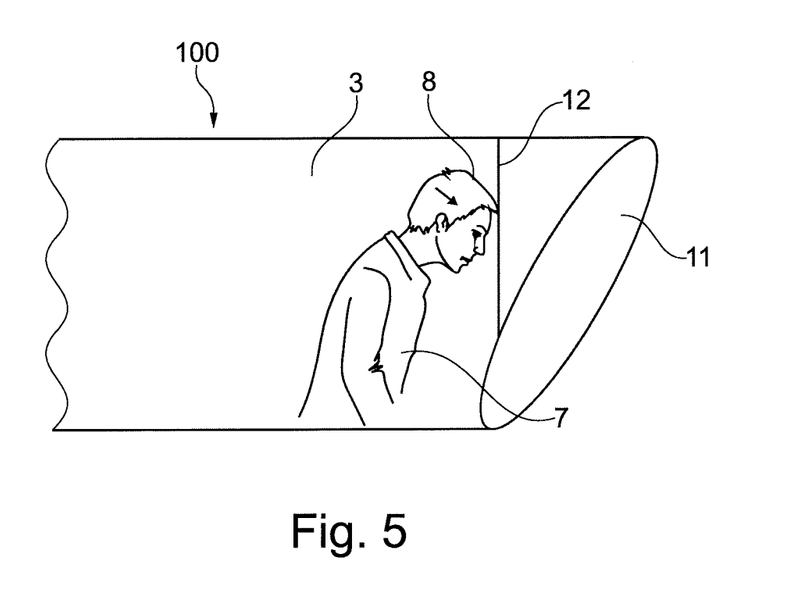
FIG. 5: Side view of curtain airbag with occupant.

The direction of deployment of the additional chamber 11 directed into the interior 1, on the one hand, can be effected by the separation line 13 which according to the invention is directed obliquely upwards in the driving direction and acts as a hinge in relation to the main chamber 3, when the curtain airbag 100 is inflated, and owing to its orientation enables a swivel motion of the additional chamber 11 directed towards the main chamber 3. Owing to the oblique orientation of the separation line 13 the additional chamber 11 is further transformed into an oblique surface sloping upwards in the driving direction, as can also be seen in FIG. 5. Thereby, the occupant 7 with the upper body or preferably with the head 8 hits the additional chamber 11 at an angle of ideally 90 degrees, so that the projected catching surface available for the protection of the occupant 7 in the moving direction of the occupant 7 is as large as possible.

Alternatively or additionally, the deploying movement of the additional chamber 11 directed into the interior 1 can be forced or supported by the tightening strap 12 which intentionally is dimensioned to be shorter than the distance of the first and the second attachment point 15 and 16, so that the additional chamber 11 upon inflation is pulled towards the main chamber 3 and the tightening strap 12 is tensioned thereby.

Figure 4:
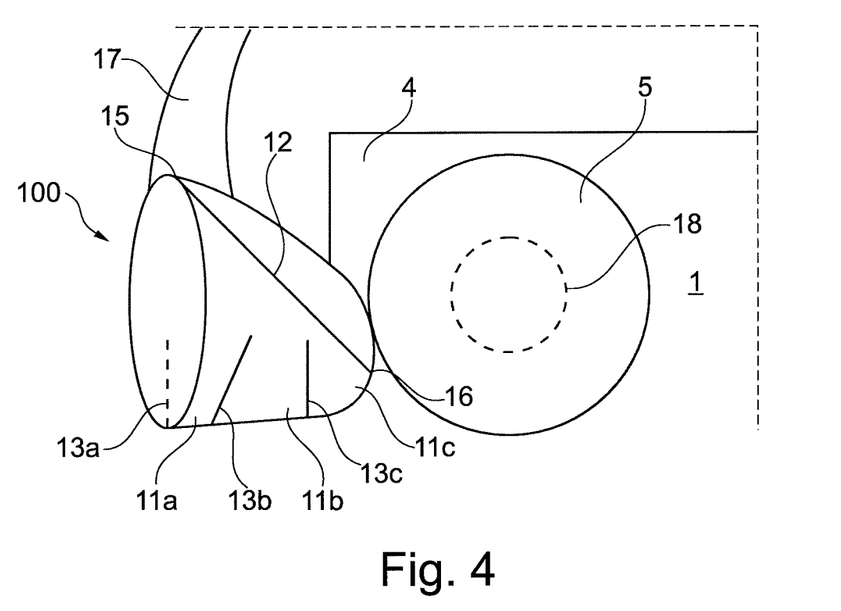
FIG. 4: Curtain airbag with airbag in the steering wheel as seen from the occupant's perspective.

In FIG. 4, the curtain airbag 100 can be seen in the inflated state as seen from the perspective of the driver's seat position. The curtain airbag 100 is located adjacent to an airbag 5 covering a steering wheel 18 and with three inflated additional chambers 11a,11b,11c protruding into the interior 1 of the vehicle. In this case, the additional chambers 11a,11b,11c are provided, which are separated from each other and towards the main chamber 3 via respective obliquely directed separation lines 13a,13b,13c. Furthermore, the tightening strap 12 running diagonally from the first attachment point 15 to the second attachment point 16 can be seen, which due to the shorter length pulls the additional chambers 11 towards the main chamber 3, and, at the same time, pulls them upwards to the oblique surface which can be seen in FIG. 5. As the additional chambers 11 intentionally are shaped in such a way that the inflation length of the curtain airbag 100 at the lower edge 102 is longer than at the upper edge 101, the inflated state shown in FIG. 4 results in a catching cushion for the occupant formed by the additional chambers 11a,11b,11c and broadening downwards. The shape of the catching cushion can also be provided only by using a diagonally running tightening strap 12 without having a sloped front edge at the front side of the curtain airbag 100. This makes sense insofar as the occupant 7 according to the average course of movement established by way of tests with the head 8 rather hits the lower half of the additional chambers 11a,11b,11c. By arranging several additional chambers 11a,11b,11c and separating them by the separation lines 13a,13b,13c a catching cushion shaped like a mattress can be formed, which has a reduced gas volume at an equal protective function compared to a catching cushion comprising one additional chamber 11 only. Furthermore, in particular the combination with the tightening strap 12 provides for a kind of hammock to be formed, which is stabilized by the tightening strap 12.

The curtain airbag 100 can be manufactured by sewing up two fabric layers or by a fabric layer which is woven as one piece according to the "One Piece Woven (OPW)"-Technology, wherein the additional chamber 11 can be part of the fabric layer/s. In this case, the separation line 13 can be formed by a separation seam penetrating both fabric layers or, when the curtain airbag 100 is manufactured according to the OPW-Technology, can be manufactured simultaneously during the weaving process.

The intruding A-pillar 17 with the (not shown) tension strap of the curtain airbag 100 fastened thereto, in the described accident situation with the small frontal overlap, automatically results in the curtain airbag 100 not being tensioned sufficiently over the total length any longer, and in the occupant 7 not being protected adequately any longer. By arranging the proposed additional chamber 11 this disadvantage can be compensated insofar as the curtain airbag 100 with the L-shaped shaping provided by the additional chamber 11 protects the occupant 7 in an improved manner independent of the tension of the curtain airbag 100, by the curtain airbag 100 in the front portion forming a bag-like catching cushion, into which the occupant 7 dives with the head 8 and is protected thereby laterally as well as frontally.

As the additional chambers 11,11a,11b, and 11c are extended downwardly by the section 21 it can be prevented that the occupant dives under bad circumstances under the airbag without being protected from hitting onto one of the interior structure parts of the vehicle. The shape of the section 21 may be designed with a lower rim parallel to the lower rim of the main chamber 3. The section 21 may be also shaped as a triangular or curved section adapted to the special conditions of the individual vehicle or to a more detailed defined crash scenario or movement of the occupant.

Figure 6:
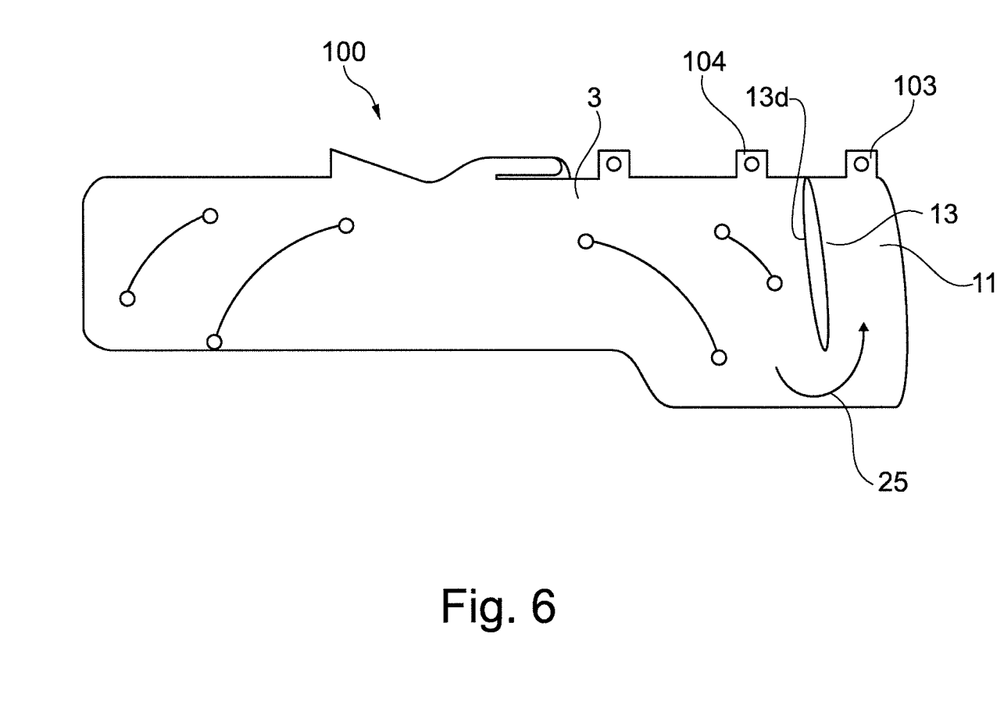
FIG. 6: Curtain airbag with an additional chamber separated by a vertical running separation line in an unfolded status.
Figure 7:
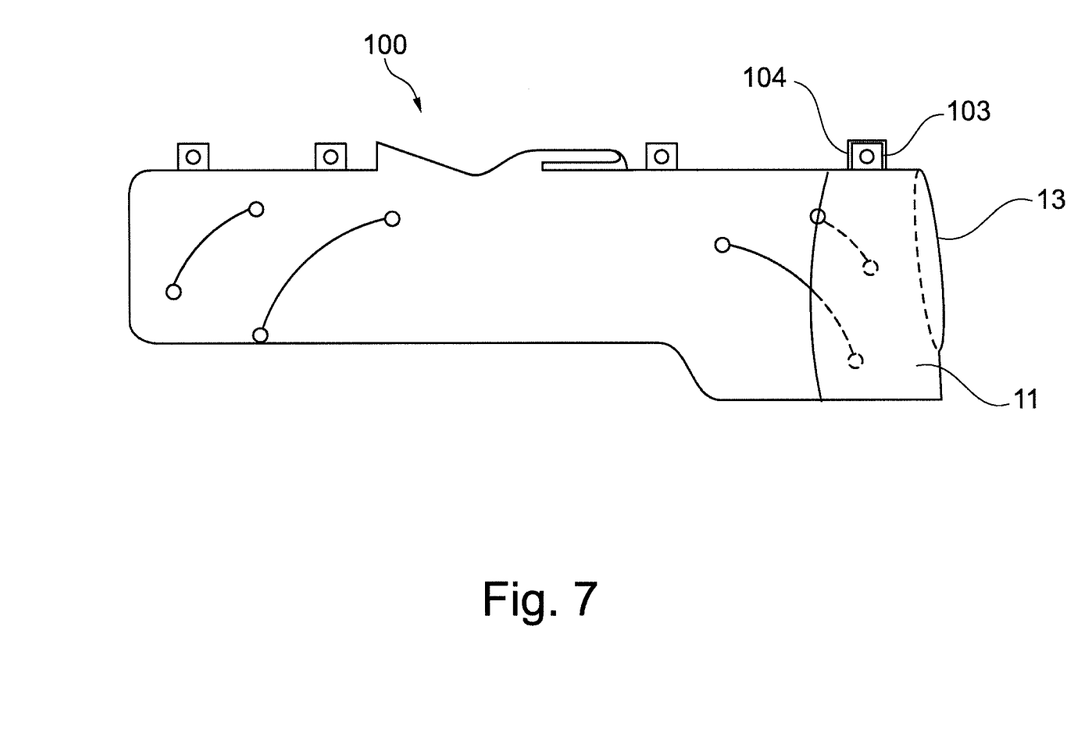
FIG. 7: Curtain airbag with an additional chamber separated by a vertical running separation line in a folded status.

In FIGS. 6 and 7 is shown another preferred embodiment of the invention where the additional chamber 11 is separated from the main chamber 3 by a vertical separation line 13 running in a closed loop 13d. The separation line 13 does not extend completely to the lower rim so that a gap 25 is provided for providing a fluidic connection between the main chamber 3 and the additional chamber 11.

The additional chamber 11 is provided with an attachment tab 103 which is folded backwards onto the main chamber 3 like shown in FIG. 7. The attachment tab 103 of the additional chamber 11 is arranged after the folding on an attachment tab 104 of the main chamber 3. The attachment tabs 103 and 104 are fixed together with a not shown fixation element, which can be also used for fixing the attachment tabs at the inner side structure 10 of the vehicle. When the curtain airbag 100 is inflated in the folded status shown in FIG. 7 the additional chamber 11 will be inflated into the interior of the vehicle as the additional chamber 11 is fixed during the inflation with the attachment tab 103 at the attachment tab 104 at least at the upper rim of the curtain airbag 100. The lower rim of the additional chamber 11 is not fixed at the main chamber 3 so that the additional chamber 11 may move without restriction into the interior of the vehicle. The additional chamber 11 got therefore a shape like a baseball glove to catch the driver when he moves into the gap between the steering wheel and the interior side structure 10.

Figure 8:
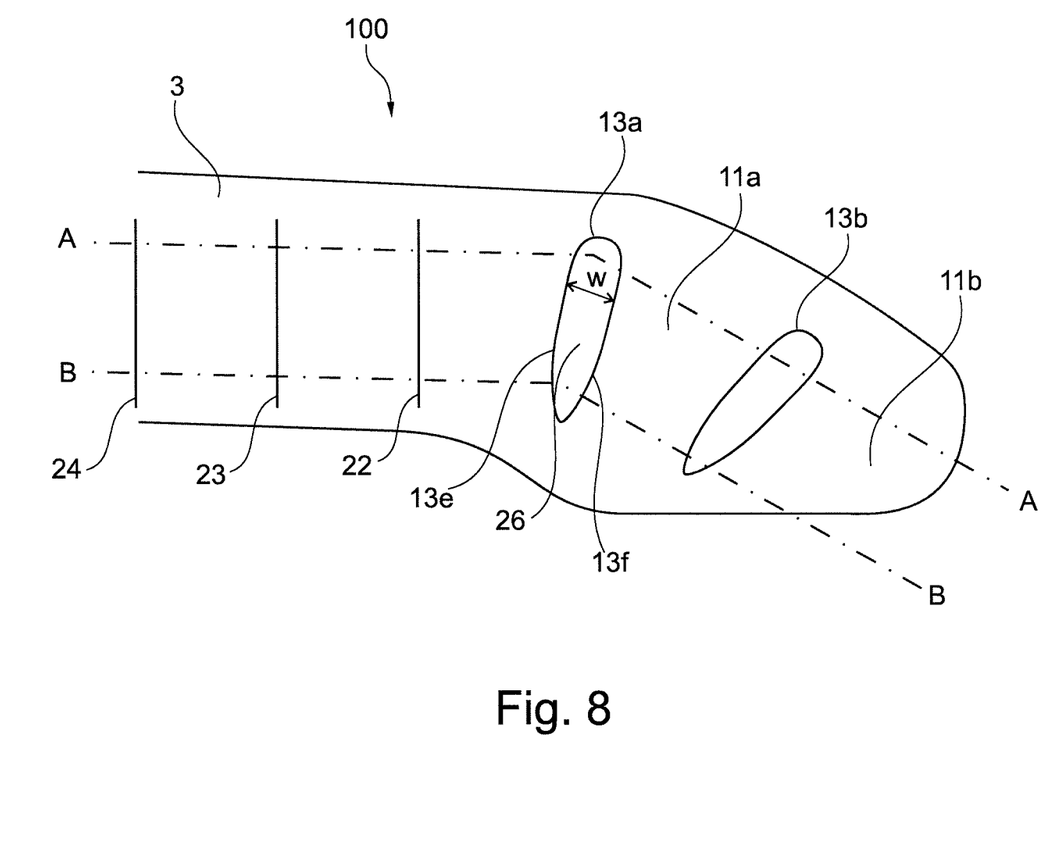
FIG. 8: Curtain airbag with two additional chambers separated by two oblique separation lines each running in loops.
Figure 9:
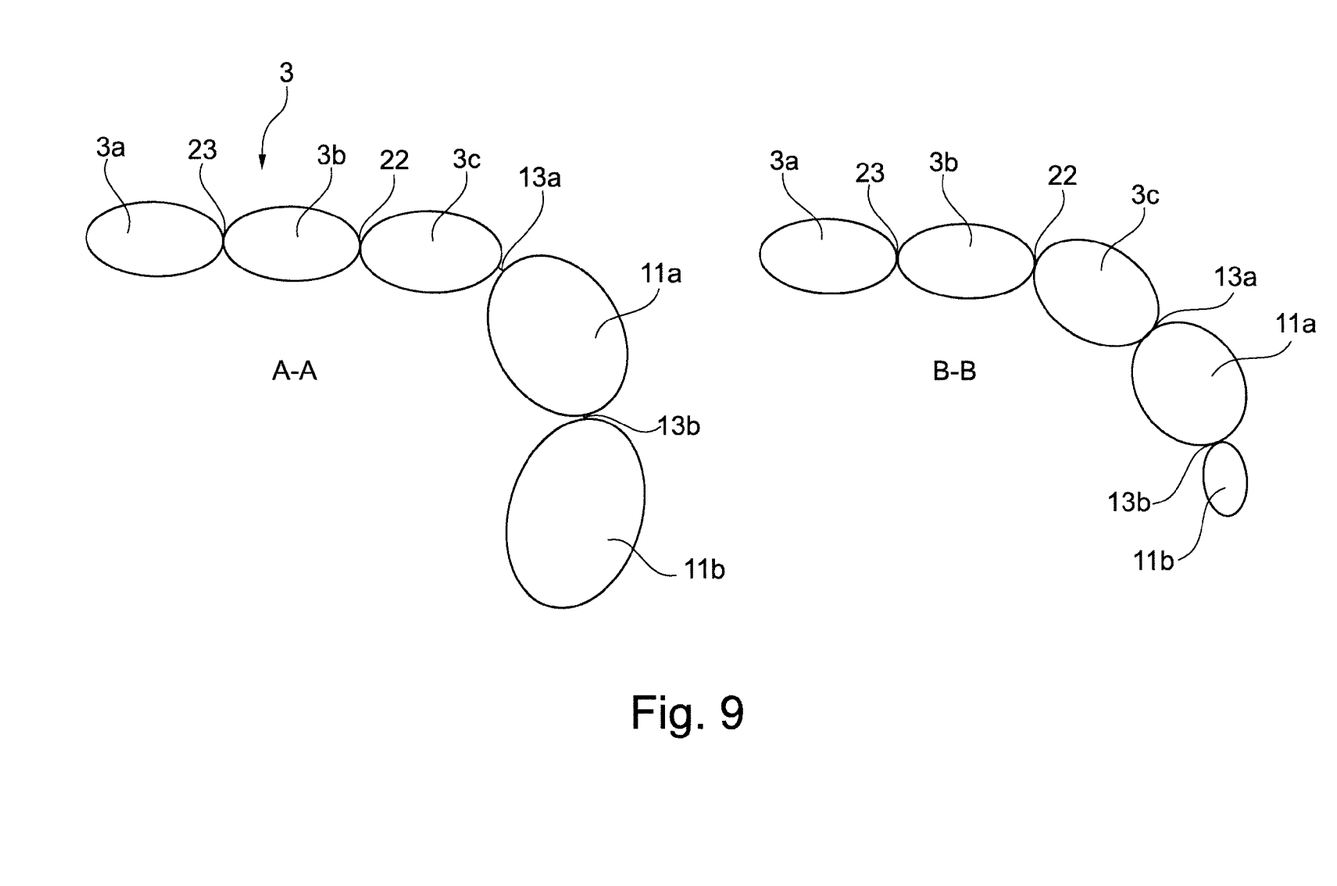
FIG. 9: Inflated chambers from the curtain airbag shown in FIG. 8 in the cross sections A-A and B-B.

In the FIGS. 8 and 9 it is shown another preferred embodiment which comprises two additional chambers 11a and 11b separated from each other and from the main chamber 3 by separation lines 13a and 13b which are running in a loop enclosing a non inflatable section 26. The separation line 13b between the additional chambers 11a and 11b is directed obliquely upward and forward in driving direction. Each loop of the separation lines 13a and 13b is shaped like a drop with the greater width in the upper section.

The main chamber 3 is separated by several vertical running separation lines 22,23 and 24 into sub chambers 3a,3b and 3c. The separation lines 22,23 and 24 do not extend over the full width of the main chamber, so that the sub chambers are in a fluidic connection in the upper and lower sections.

The separation lines 22,23 and 24 are designed as single seams so that the sub chambers 3a,3b and 3c are also in the inflated status in a close contact like in a mattress.

The separation lines 13a and 13b comprises two single seams 13e and 13f which are distanced and enclose a non inflatable section 26. As the separation line 13a are 13b are running in a drop like shape, wherein the distance W between the single seams 13e and 13f in the cross section A-A (the upper part) is greater than the distance W between the single seams 13e and 13f in the cross section B-B (the lower part of the curtain airbag 100). The separation lines 13a and 13b can also be realized in the weaving process, when the curtain airbag 100 is made in a one piece woven (OPW) process. This is also valid for the separation lines in general in the other embodiments.

When the curtain airbag 100 in FIG. 8 is inflated the separation lines 13a and 13b provide an arrangement of the additional chambers 11a and 11b like shown in FIG. 9 wherein the drop shaped separation lines 13a and 13b enables because of their course a greater movement into the interior in the upper section (cross section A-A) than in the lower section (cross section B-B). The deflection of the additional chambers 11a and 11b into the interior of the compartment is obliges in this case by the dimensions of the chambers and the arrangement and course of the separation lines 13a and 13b in combination with dimensioning the outer shape of the curtain airbag 100.

The invention claimed is:

1. A curtain airbag for a vehicle, the curtain airbag comprising:
    a main chamber extending in a longitudinal direction and adapted to cover an inner side structure of the vehicle;
    an additional chamber forwardly positioned relative to the main chamber in a driving direction and in communication with the main chamber through a flow channel; and
    a separation line separating flow of inflation gas between the main chamber and the additional chamber, the separation line oriented obliquely relative to the longitudinal direction, the separation line defining an obliquely oriented hinge about which the additional chamber rotates relative to the main chamber upon inflation, the separation line formed into the curtain airbag and separating a flow of inflation gas between the main chamber and the additional gas chamber independent of rotation of the additional chamber relative to the main chamber.

2. The curtain airbag according to claim 1, wherein the additional chamber shows such a shaping that the inflation length of the curtain airbag, in the mounting position, is longer at a lower edge than at an upper edge.

3. The curtain airbag according claim 1, wherein, the additional chamber in the inflated state shows an obliquely directed orientation sloping upwards in a longitudinal direction of the vehicle.

4. The curtain airbag according to claim 1, wherein the additional chamber is formed by a chamber volume being at least partially separated from the main chamber, which volume is separated from the main chamber by the separation line which, in the inflated state of the curtain airbag, in a longitudinal direction of the vehicle runs obliquely upwards.

5. The curtain airbag according to claim 4, wherein at least two additional chambers are provided, which are separated from the main chamber or from each other by obliquely directed separation lines.

6. The curtain airbag according to claim 4, wherein the separation line separates flow between the main chamber and the additional chamber both prior to and after rotation of the additional chamber relative to the main chamber.

7. The curtain airbag according to claim 1, further comprising a tightening strap having a first end fastened to the main chamber at a first attachment point and a second end fastened to the additional chamber at a second attachment point, the tightening strap being shorter than a maximum distance between the first and the second attachment point, which would result from the curtain airbag being inflated without the tightening strap.

8. The curtain airbag according to claim 7, wherein the second attachment point and the first attachment point are located on the curtain airbag in such a way that, when the curtain airbag is inflated, the second attachment point is located beneath the first attachment point and, in a longitudinal direction of the vehicle, is located in front of the first attachment point.

9. The curtain airbag according to claim 1, wherein the additional chamber inflates substantially perpendicular to the main chamber.

10. The curtain airbag according to claim 1, wherein the curtain airbag is shaped in such a way, that at least the additional chamber is extending with a section downwardly from a lower rim of the main chamber.

11. The curtain airbag according to claim 1, wherein the additional chamber is folded backwards onto the main chamber using the separation line as a hinge.

12. The curtain airbag according to claim 11, wherein the additional chamber includes an attachment tab which is folded onto an attachment tab of the main chamber and fixed with the attachment tab of the main chamber with a common fixation element for fixing both tabs together at an inner side structure of the vehicle.

13. The curtain airbag according to claim 11, wherein the separation line is a vertical running separation line.

14. The curtain airbag according to claim 1, wherein the additional chamber is separated from the main chamber or from another additional chamber by two distanced separation lines which enclose a non-inflatable section.

15. The curtain airbag according to claim 1, wherein the additional chamber is separated from the main chamber by a separation line which runs in a closed loop.

16. The curtain airbag of claim 1, wherein upon inflation of the curtain airbag, the additional chamber extends perpendicular to the longitudinal direction and is upwardly angled in the forward direction and the additional chamber is transformed into an oblique surface sloping upward in the driving direction.

17. The curtain airbag of claim 1, wherein the curtain airbag includes a downwardly extending portion at a forward end, the downwardly extending portion extends downward beyond a lower rim of the main chamber.

18. The curtain airbag of claim 1, further comprising a tightening strap having a first end fastened to the main chamber at a first attachment point and a second end fastened to the additional chamber at a second attachment point, the strap oriented obliquely downward from the first attachment point to the second attachment point.

* * * * *